(12) United States Patent
Takahashi et al.

(10) Patent No.: US 8,096,666 B2
(45) Date of Patent: Jan. 17, 2012

(54) LASER PROJECTOR PERFORMING LASER RASTER SCAN USING A SCANNING MIRROR

(75) Inventors: Yutaka Takahashi, Daito (JP); Hiroki Matsubara, Daito (JP); Seiji Takemoto, Daito (JP); Atsuya Hirano, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 385 days.

(21) Appl. No.: 12/359,732

(22) Filed: Jan. 26, 2009

(65) Prior Publication Data
US 2009/0190103 A1 Jul. 30, 2009

(30) Foreign Application Priority Data
Jan. 29, 2008 (JP) ................................. 2008-018012

(51) Int. Cl.
*G03B 21/00* (2006.01)
(52) U.S. Cl. .......................................... 353/122; 353/94
(58) Field of Classification Search .................... 353/30, 353/34, 94, 122; 359/202.1, 204.5, 205.1, 359/207.1, 207.2, 207.3, 207.4, 207.5
See application file for complete search history.

(56) References Cited

U.S. PATENT DOCUMENTS

| | | | |
|---|---|---|---|
| 5,274,492 A | 12/1993 | Razzaghi | |
| 5,825,555 A | 10/1998 | Oono et al. | |
| 6,002,505 A * | 12/1999 | Kraenert et al. | 359/196.1 |
| 6,262,781 B1 * | 7/2001 | Deter | 348/744 |
| 7,144,117 B2 * | 12/2006 | Kojima | 353/37 |
| 7,264,360 B2 * | 9/2007 | Hatakeyama et al. | 353/99 |
| 2003/0011751 A1 * | 1/2003 | Sakata et al. | 353/30 |
| 2005/0035943 A1 * | 2/2005 | Kojima | 345/156 |

FOREIGN PATENT DOCUMENTS

| | | |
|---|---|---|
| JP | 8-15639 | 1/1996 |
| JP | 2002-328428 | 11/2002 |
| JP | 2003-75768 | 3/2003 |
| JP | 2006-91471 | 4/2006 |
| JP | 2007-264554 | 10/2007 |
| JP | 2009-540360 A | 11/2009 |
| WO | 2007/000715 A1 | 1/2007 |
| WO | 2007/145769 A2 | 12/2007 |

OTHER PUBLICATIONS

Japanese Notice of Grounds of Rejection for Patent Application No. 2008-018012, mailed Dec. 15, 2009, and English translation thereof (5 pages).
English abstract from espacenet for Japanese application with Publication No. 2009-540360, Publication date: Nov. 19, 2009 (1 page).
Mechanical English translation from espacenet for Japanese application with Publication No. 2009-540360, Publication date: Nov. 19, 2009 (9 pages).
Extended European Search Report for Application No. 09001043.0-1240, mailed on Mar. 6, 2009. (6 pages). esp@cenet patent abstract for Japanese Publication No. 2007264554, Publication date Oct. 11, 2007 (1 page).

(Continued)

*Primary Examiner* — Francis M Legasse, Jr.
*Assistant Examiner* — Bao-Luan Le
(74) *Attorney, Agent, or Firm* — Osha Liang LLP

(57) ABSTRACT

An enlarging optical unit receives laser light emitted from a laser light source, enlarges a light flux of the received laser light to have a diverging angle corresponding to a swing angle of a scanning mirror and provides it to the scanning mirror.

2 Claims, 6 Drawing Sheets

OTHER PUBLICATIONS esp@cenet patent abstract for Japanese Publication No. 2002328428, Publication date Nov. 15, 2002 (1 page).

esp@cenet patent abstract for Japanese Publication No. 2003075768, Publication date Mar. 12, 2003 (1 page).

esp@cenet patent abstract for Japanese Publication No. 2006091471, Publication date Apr. 6, 2006 (1 page).

esp@cenet patent abstract for Japanese Publication No. 8015639, Publication date Jan. 19, 1996 (1 page).

* cited by examiner

FIG.2

| MIRROR SWING ANGLE | RESOLUTION | | | |
|---|---|---|---|---|
| | QVGA(320x240) VERTICAL PIXEL NUMBER 240 | VGA(640x480) VERTICAL PIXEL NUMBER 480 | SVGA(800x600) VERTICAL PIXEL NUMBER 600 | XGA(1024x768) VERTICAL PIXEL NUMBER 768 |
| 5 | 0.0208 | 0.0104 | 0.0083 | 0.0065 |
| 10 | 0.0418 | 0.0209 | 0.0167 | 0.0131 |
| 15 | 0.0629 | 0.0314 | 0.0251 | 0.0196 |
| 20 | 0.0842 | 0.0421 | 0.0337 | 0.0263 |
| 25 | 0.1059 | 0.0529 | 0.0423 | 0.0331 |
| 30 | 0.1279 | 0.0640 | 0.0512 | 0.0400 |
| 35 | 0.1505 | 0.0753 | 0.0602 | 0.0470 |
| 40 | 0.1738 | 0.0869 | 0.0695 | 0.0543 |

LASER PROJECTOR PERFORMING LASER RASTER SCAN USING A SCANNING MIRROR

BACKGROUND OF THE INVENTION

1. Field of the Invention

The invention relates to a laser projector, and particularly to a laser projector performing laser raster scan using a scanning mirror.

2. Description of the Background Art

Various techniques have been proposed in connection with laser projectors for displaying clear images.

For example, in a laser projector disclosed in Japanese Patent Laying-Open No. 2007-264554, a projection optical system includes a reflection member for reflecting image light that enters the projection optical system and includes a projection image, and an imaging lens system composed of one or more lenses located on an optical path of the light reflected by a reflection surface of the reflection member. The reflection member is arranged such that the reflection surface has a variable inclination angle with respect to image light, and the imaging lens system is arranged in a variable position such that it can be located on the optical path of the reflected light changed according to changes in inclination angle. Thereby, it becomes possible to change a position of a projection target surface onto which the image is projected, and the clear image can be projected onto the projection target surface thus changed.

A laser projector disclosed in Japanese Patent Laying-Open No. 2002-328428 receives image data from a portable data processing device, emits laser light from a light source of semiconductor laser, reflects the laser light to apply it to a wall surface and changes an angle of the mirror by a mirror driver under control of a controller. The laser light is scanned two-dimensionally for projecting the image. A light receiver detects the laser light reflected by the wall surface to calculate a distance to the wall surface, and corrects the angle of the mirror according to the calculated distance. Thereby, deformation of the projected image can be corrected.

In a laser projector disclosed in Japanese Patent Laying-Open No. 2003-075768, light emitted from a light source is led by first and second light collecting lenses to a DMD (Digital Micromirror Device), is reflected by the DMD for light modulation, and the light thus modulated is projected by a projection lens. The projection lens is moved in a direction parallel to an optical axis for shifting a projection position. In synchronization movement of the projection lens, a center of the first light collecting lens is shifted with respect to an optical reference axis to change a light incident angle to the DMD. The above configuration provides a projector optical system (i.e., an optical system for a projector) that has a simple structure, is of a non-telecentric type not using a prism, allows so-called "lens shift" and uses the DMD.

A laser projector disclosed in Japanese Patent Laying-Open No. 2006-091471 includes a retardation sheet corresponding to a wavelength of light emitted from a light source, and drive means for driving the retardation sheet to change polarization of the light emitted from the light source. Thereby, the polarization of the light to which the retardation sheet is added is changed with time, and this makes it difficult to recognize speckle noises by human eyes.

A laser projector disclosed in Japanese Patent Laying-Open No. 08-015639 includes a light source, a heat ray cut-off filter for removing heat rays form light fluxes emitted from the light source, a condensing lens substantially collimating the light fluxes from which the heat rays are removed, a modified mirror type of spatial light modulation element modulating the collimated light flux according to an image signal, a projection lens projecting the reflected light incoming from the spatial light modulation element onto a screen, and a baffle that cuts off the light modulated by the spatial light modulation element except for the light reflected in the direction of its optical axis, and forms an entrance pupil of the projection lens. The modified mirror type of spatial light modulation element is configured such that, when all mirrors in this element are directed in the direction allowing entry of the light fluxes into the projection lens, the element has a certain power as a whole, and collects or converges the light fluxes diverging from the light source into the entrance pupil of the projection lens. Thereby, the image prepared by the spatial light modulation element and having a large area can be projected and displayed without increasing the optical system.

According to the techniques in the foregoing five publications, however, the laser projector emits the parallel rays of laser light so that the following problem arises.

Referring to FIG. 6, laser projector 99 emits and projects parallel rays onto a screen. A beam diameter on the screen is D independently of a distance between the screen and the laser projector.

However, when a distance from the screen to laser projector 99 is long, a display size of a projected image on the screen is large. Consequently, a space occurs between the emitted beams to cause irregularity in brightness of the projected image.

Conversely, when the distance between the screen and laser projector 99 is short, the display size of the projected image on the screen is small. Consequently, the emitted beams overlap together to reduce a resolution of the projected image on the screen.

SUMMARY OF THE INVENTION

An object of the invention is to provide a laser projector that can always display clear images even when a distance to a projection surface changes.

According to the invention, a laser projector includes a laser light source emitting laser light; and a scanning mirror scanning the laser light emitted from the laser light source. Further, the laser projector includes an enlarging optical unit enlarging a light flux of the laser light emitted from the laser light source to have a diverging angle corresponding to a swing angle of the scanning mirror. The enlarging optical unit enlarges the light flux of the laser light to have a diverging angle $\alpha$ determined by the following equation (1):

$$\alpha = \arctan(\tan(\theta/2)/(YN/2)) \qquad (1)$$

where $\theta$ represents the swing angle in the horizontal and vertical directions of the scanning mirror, and YN represents the number of pixels in the vertical direction of a projected image.

Also, according to the invention, a laser projector includes a laser light source emitting laser light; and a scanning mirror scanning the laser light emitted from the laser light source. Further, the laser projector includes an enlarging optical unit enlarging a light flux of the laser light emitted from the laser light source to have a diverging angle corresponding to a swing angle of the scanning mirror.

Preferably, the enlarging optical unit enlarges the light flux of the laser light to have a diverging angle $\alpha x$ in a horizontal direction determined by the following equation (2):

$$\alpha x = \arctan(\tan(\theta x/2)/(XN/2)) \qquad (2)$$

where θx represents the swing angle in the horizontal direction of the scanning mirror, and XN represents the number of pixels in the horizontal direction of the projected image.

Preferably, the enlarging optical unit enlarges the light flux of the laser light to have a diverging angle αy in the vertical direction determined by the following equation (3):

$$\alpha y = \arctan(\tan(\theta y/2)/(YN/2)) \quad (3)$$

where θy represents the swing angle in the vertical directions of the scanning mirror, and YN represents the number of pixels in the vertical direction of the projected image.

The laser projector according to the invention can always display clear images even when a distance to a projection surface changes.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an example of a diverging angle of a light flux of laser light corresponding to a swing angle of a scanning mirror.

DESCRIPTION OF THE PREFERRED EMBODIMENTS

An embodiment of the invention will be described below with reference to the drawings.

Figure 1:
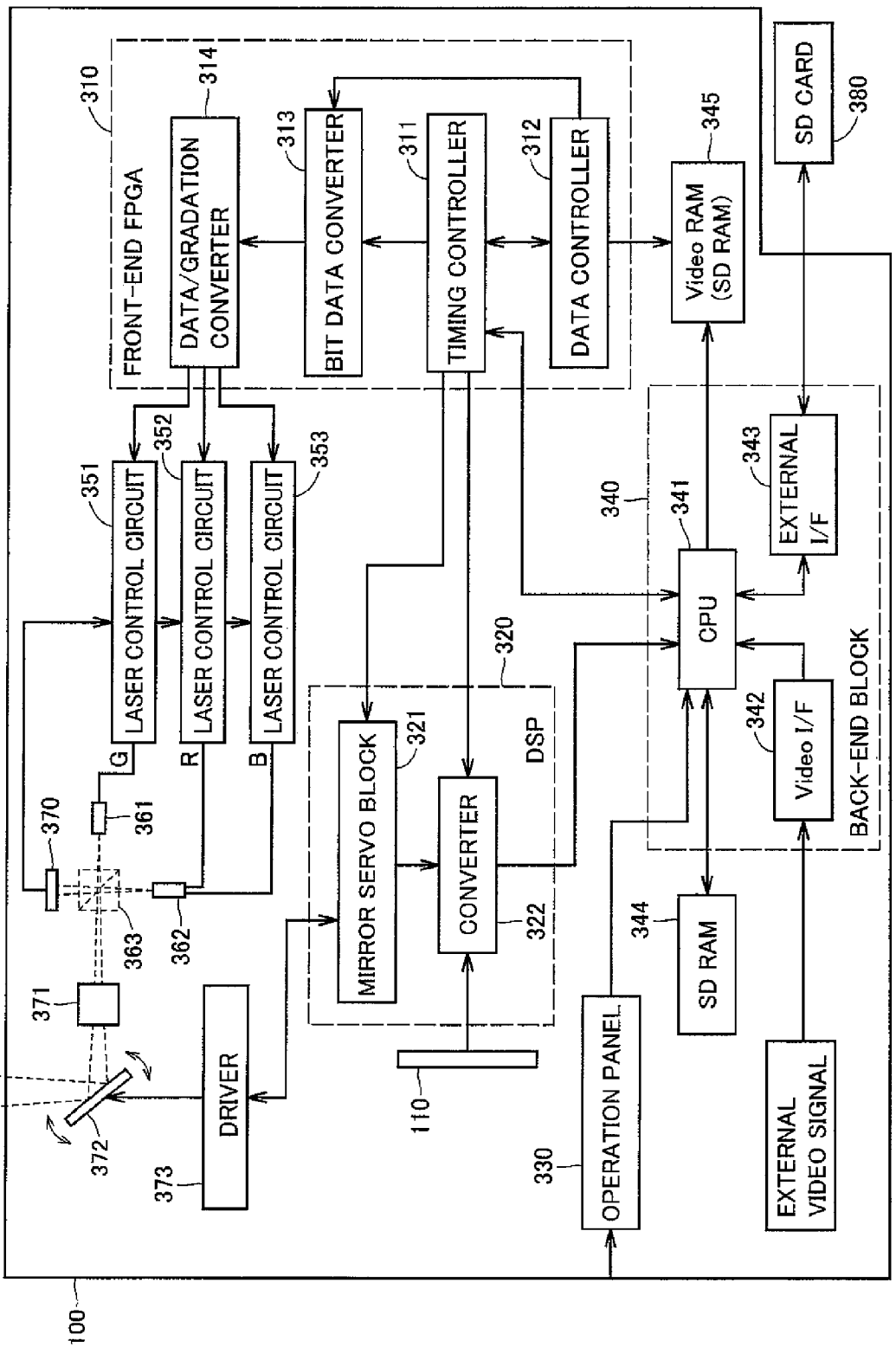
FIG. 1 shows a structure of a laser projector of an embodiment of the invention.

FIG. 1 shows a structure of a laser projector of the embodiment of the invention.

Referring to FIG. 1, a laser projector 100 includes a front-end FPGA (Field Programmable Gate Array) 310, a digital signal processor 320, an operation panel 330, a back-end block 340, an SDRAM (Synchronous Dynamic Random Access Memory) 344, a video RAM Random Access Memory) 345, laser control circuits 351, 352 and 353, a green LD (Laser Diode) 361, a red/blue LD 362, a polarization beam splitter 363, a detector 370, a scanning mirror 372 and a driver 373. Driver 373 includes, for example, a driver motor, a coil or the like.

Front-end FPGA 310 includes a data/gradation converter 314, a timing controller 311, a data controller 312, and a bit data converter 313. Digital signal processor 320 includes a mirror servo block 321 and a converter 322. Although red/blue LD 362 is such that a red LD and a blue LD are integrally formed, these may be formed independently of each other.

Operation panel 330 is arranged on a front surface or side surface of a casing of laser projector 100. Operation panel 330 includes, for example, a display device (not shown) that displays details of operations as well as switches (e.g., plus/minus buttons) that accept an operation input for laser projector 100. When operation panel 330 accepts an operation, operation panel 330 sends out a signal according to the operation to a CPU (Central Processing Unit) 341 of back-end block 340.

An image signal provided from an external source of laser projector 100 is inputted to a video interface 342. In one aspect, laser projector 100 includes an external interface 343. External interface 343 accepts, for example, loading of an SD (Secure Digital) card 380. External interface 343 reads data from SD card 380 and the data is stored in SDRAM 344 or video RAM 345.

CPU 341 controls projection of images obtained based on signals inputted to laser projector 100 through external video interface 342 or external interface 343, based on an operation input provided to operation panel 330. More specifically, by performing mutual communication with timing controller 311 of front-end FPGA 310, CPU 341 controls display of images obtained based on image data that is temporarily stored in video RAM 345.

In front-end FPGA 310, timing controller 311 reads data stored in video RAM 345 through data controller 312 based on an-instruction sent from CPU 341. Data controller 312 sends out the read data to bit data converter 313. Bit data converter 313 sends out the data to data/gradation converter 314 based on an instruction from timing controller 3 11. Bit data converter 313 converts image data provided from an external source, into a format that conforms to a format for projection by the laser light emission.

Data/gradation converter 314 converts the data outputted from bit data converter 313, into color gradation for displaying the data as three colors of G, R, and B and sends out the converted data to laser control circuits 351, 352, and 353.

On the other hand, timing controller 311 controls drive of two-axis scanning mirror 372 with digital signal processor 320. More specifically, timing controller 311 sends out an instruction to mirror servo block 321 to drive driver 373. In response to the instruction, driver 373 changes the position and tilt of two-axis scanning mirror 372.

Converter 322 performs A/D (Analog to Digital) conversion of a signal sent from a CCD (Charge Coupled Device) sensor 110, based on a signal sent from timing controller 311 and sends out digital data obtained by the conversion to CPU 341. For example, when CCD sensor 110 shoots a subject present within a shootable range thereof, an image signal of the subject is sent to CPU 341. When a setting for displaying an image shot by CCD sensor 110 is valid, CPU 341 sends an instruction to timing controller 311 to display an image based on data corresponding to the image signal.

Also, converter 322 transmits a signal sent from mirror servo block 321, to CPU 341. For example, converter 322 generates a signal including an instruction provided to driver 373 and a state of driver 373, and sends out the signal to CPU 341.

Laser control circuit 351 controls drive of green LD 361 based on a signal sent from data/gradation converter 314. Similarly, laser control circuits 352 and 353 control the red LD and the blue LD according to an instruction sent from data/gradation converter 314, respectively. Green LD 361 and red/blue LD 362 emit laser light according to their respective control.

Polarization beam splitter 363 is disposed on an optical path of the laser light emitted from green LD 361. Polarization beam splitter 363 passes green LD 361 therethrough. Also, polarization beam splitter 363 partially passes and partially reflects red/blue LD 362. Detector 370 is disposed on optical paths of the laser light emitted from red/blue LD 362.

Each light flux of the laser light passed through polarization beam splitter 363 is enlarged by an enlarging optical unit 371 to have a diverging angle α, and is reflected by scanning mirror 372. The reflected light is projected outside by laser projector 100. At this time, scanning mirror 372 changes the tilt thereof by drive of driver 373.

Scanning mirror 372 is a two-axis galvanometer mirror or an MEMS (Micro-Electro Mechanical System) scanner mirror. By turning the scanner mirror within a range of a horizontal swing angle θ and a vertical swing angle θ, raster scan of the laser light is performed.

Enlarging optical unit 371 receives the laser light, enlarges the light flux of the received laser light to have a diverging angle corresponding to the swing angle of scanning mirror 372 and outputs it to scanning mirror 372.

More specifically, enlarging optical unit 371 enlarges the light flux of the received laser light to have diverging angle α defined by the following equation (A1) in all directions:

$$\alpha = \arctan(\tan(\theta/2)/(YN/2)) \quad (A1)$$

where θ represents the swing angle in the horizontal and vertical directions of scanning mirror 372, and YN represents the number of pixels in the vertical direction of the projected image. The equation (A1) uses number YN of pixels in the vertical direction because the scanning in the horizontal direction is performed continuously (i.e., without interruption in time) and therefore does not significantly affect the clearness of the image even when the laser light fluxes are spaced from each other or overlap each other.

FIG. 2 illustrates an example of the diverging angle of the light flux of the laser light corresponding to the swing angle of scanning mirror 372.

Referring to FIG. 2, when the projected image is a QVGA (Quarter Video Graphics Array) having 240 pixels in the vertical direction, diverging angle α becomes equal to 0.0208, 0.0418, . . . and 0.1738 corresponding to swing angle θ of scanning mirror 372 equal to 5, 10, . . . and 40 degrees, respectively.

When the projected image is a VGA (Video Graphics Array) image having 480 pixels in the vertical direction, diverging angle a becomes equal to 0.0104, 0.0209, . . . and 0.0869 corresponding to swing angle θ of scanning mirror 372 of 5, 10, . . . and 40 degrees, respectively.

When the projected image is an SVGA (Super Video Graphics Array) image having 600 pixels in the vertical direction, diverging angle α becomes equal to 0.0083, 0.0167, . . . and 0.0695 corresponding to swing angle θ of scanning mirror 372 of 5, 10, . . . and 40 degrees, respectively.

When the projected image is an XGA (eXtended Video Graphics Array) image having 480 pixels in the vertical direction, diverging angle α becomes equal to 0.0065, 0.0131, . . . and 0.0543 corresponding to swing angle θ of scanning mirror 372 of 5, 10, . . . and 40 degrees, respectively.

Figure 3:
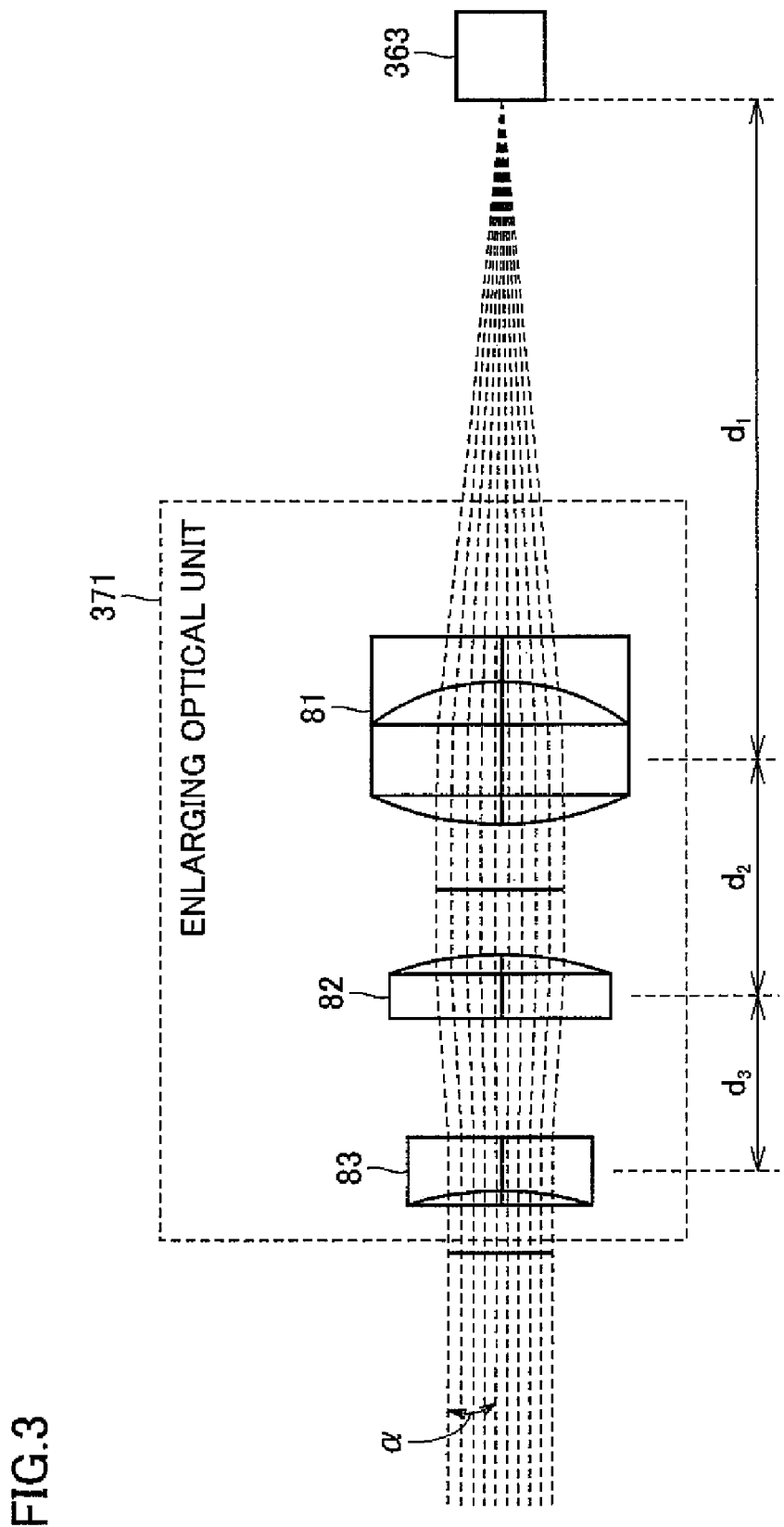
FIG. 3 shows an example of a structure of an enlarging optical unit.

FIG. 3 shows an example of a structure of an enlarging optical unit.

Referring to FIG. 3, the enlarging optical unit includes first, second and third lenses 81, 82 and 83.

First lens 81 is a collimate lens that collimates incoming light. Second and third lenses 82 and 83 causes the incoming laser light to diverge, and the light flux of the laser light passed through third lens 83 becomes diverging light having diverging angle α in the horizontal and vertical directions.

For obtaining diverging angle α of a desired value, adjustments are made to a distance d1 between polarization beam splitter 363 and first lens 81, a distance d2 between first and second lenses 81 and 82, a distance d3 between second and third lenses 82 and 93 and curvatures of the second and third lenses 82 and 83.

Figure 4:
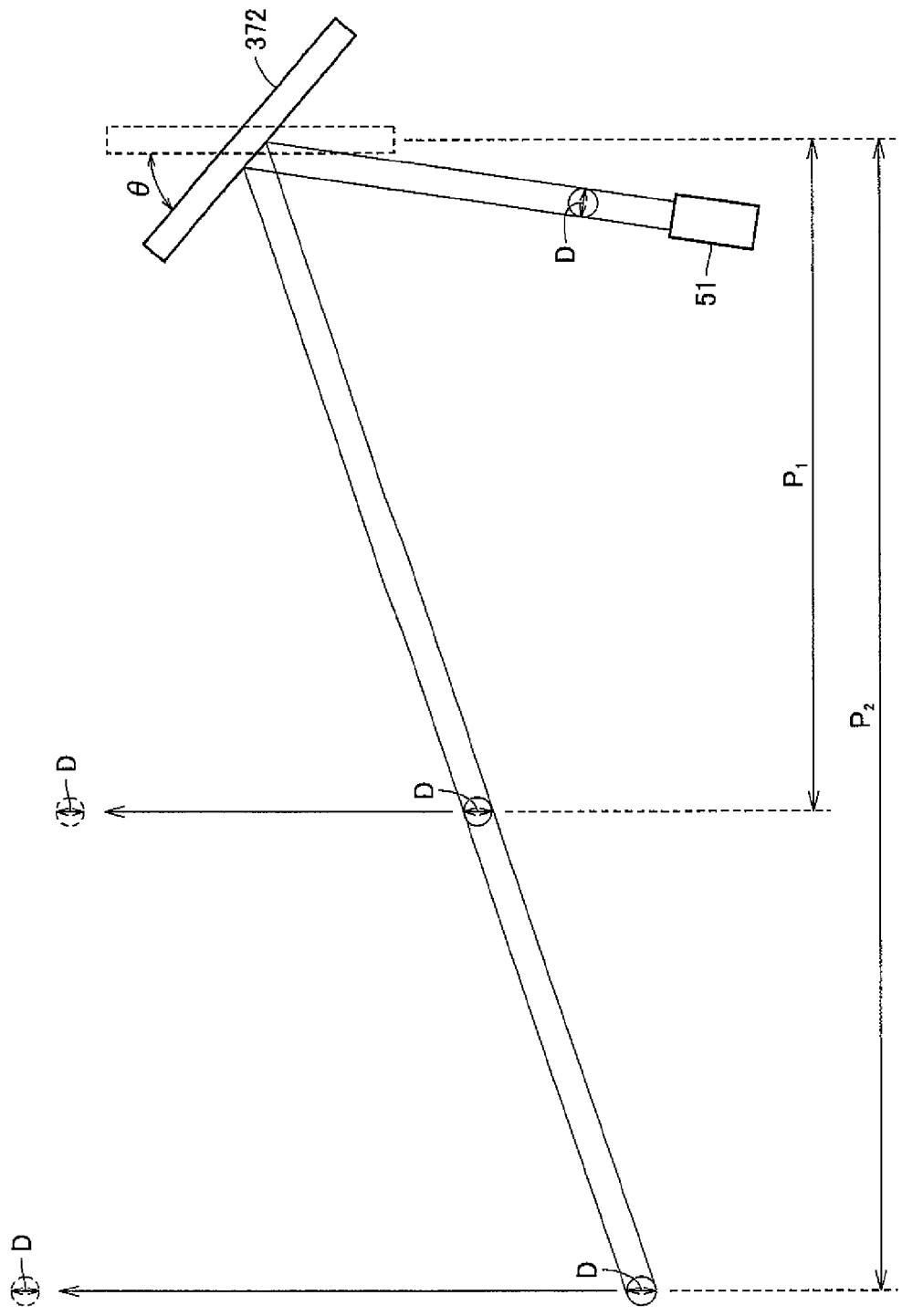
FIG. 4 illustrates a beam projected onto a screen in a prior art.

FIG. 4 illustrates a beam projected onto a screen in a prior art.

Referring to FIG. 4, parallel light emitted from a parallel optical unit 51 is reflected by scanning mirror 372 and is projected onto a screen arranged at a predetermined distance.

When the light flux of the laser light emitted from parallel optical unit 51 has a beam diameter of D, the light flux of the projected laser light has a beam diameter of D in either of the cases where the screen is spaced from the laser projector by a distance of P1 and where these are spaced by a distance of P2. Thus, even when the distance to the screen increases, the beam diameter of the light flux of the projected laser is constant in the prior art.

However, when the distance to the screen increases, the display area on the screen increases. Consequently, a space that is not irradiated with the laser beam increases on the screen, and the projected image displayed on the screen is blurred.

Conversely, when the distance to the screen is too short, the display area on the screen is small. Consequently, the laser beams overlap together on the screen so that the projected image displayed on the screen is blurred.

Figure 5:
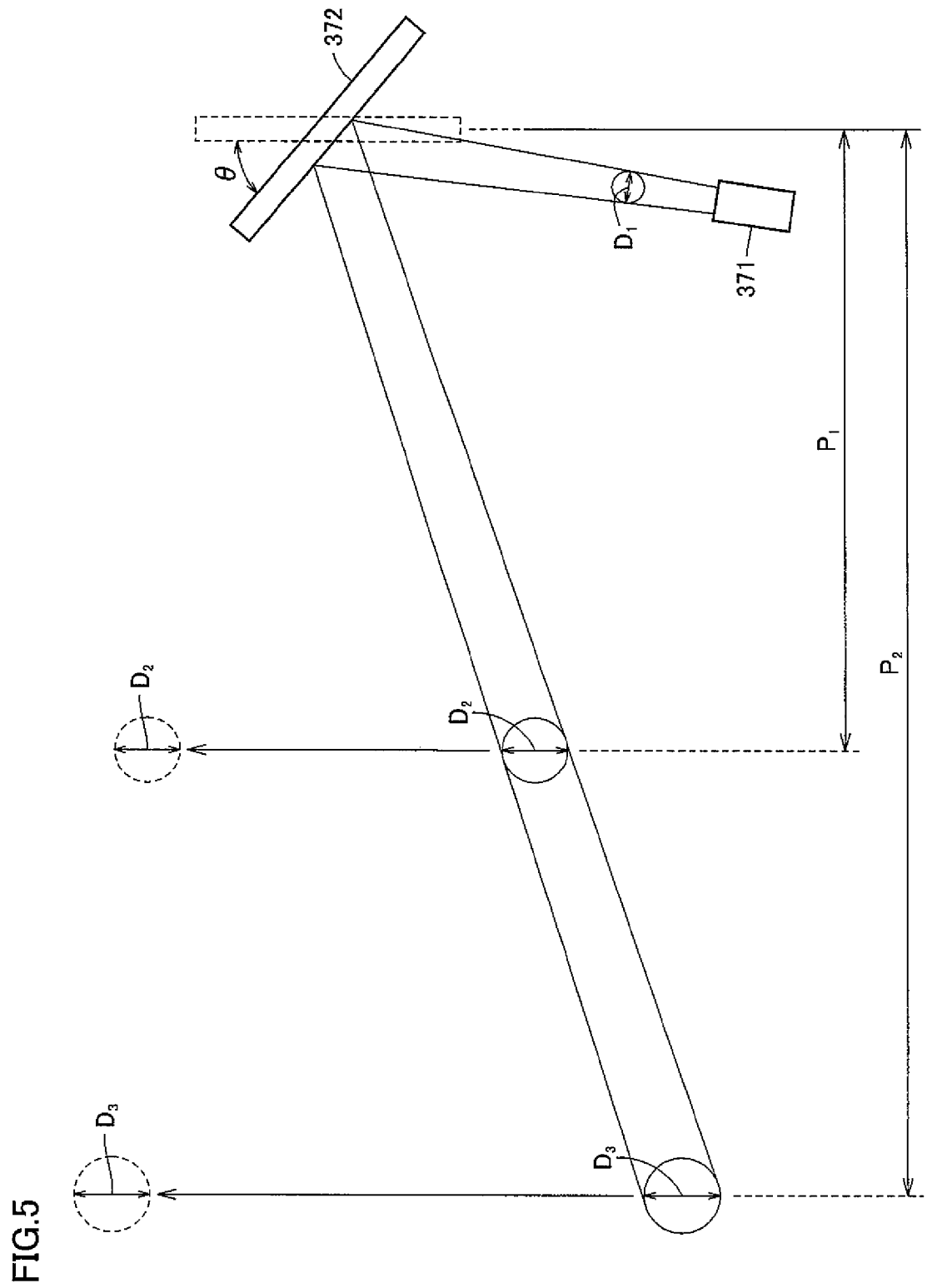
FIG. 5 illustrates a beam projected onto a screen in an embodiment of the invention.
Figure 6:
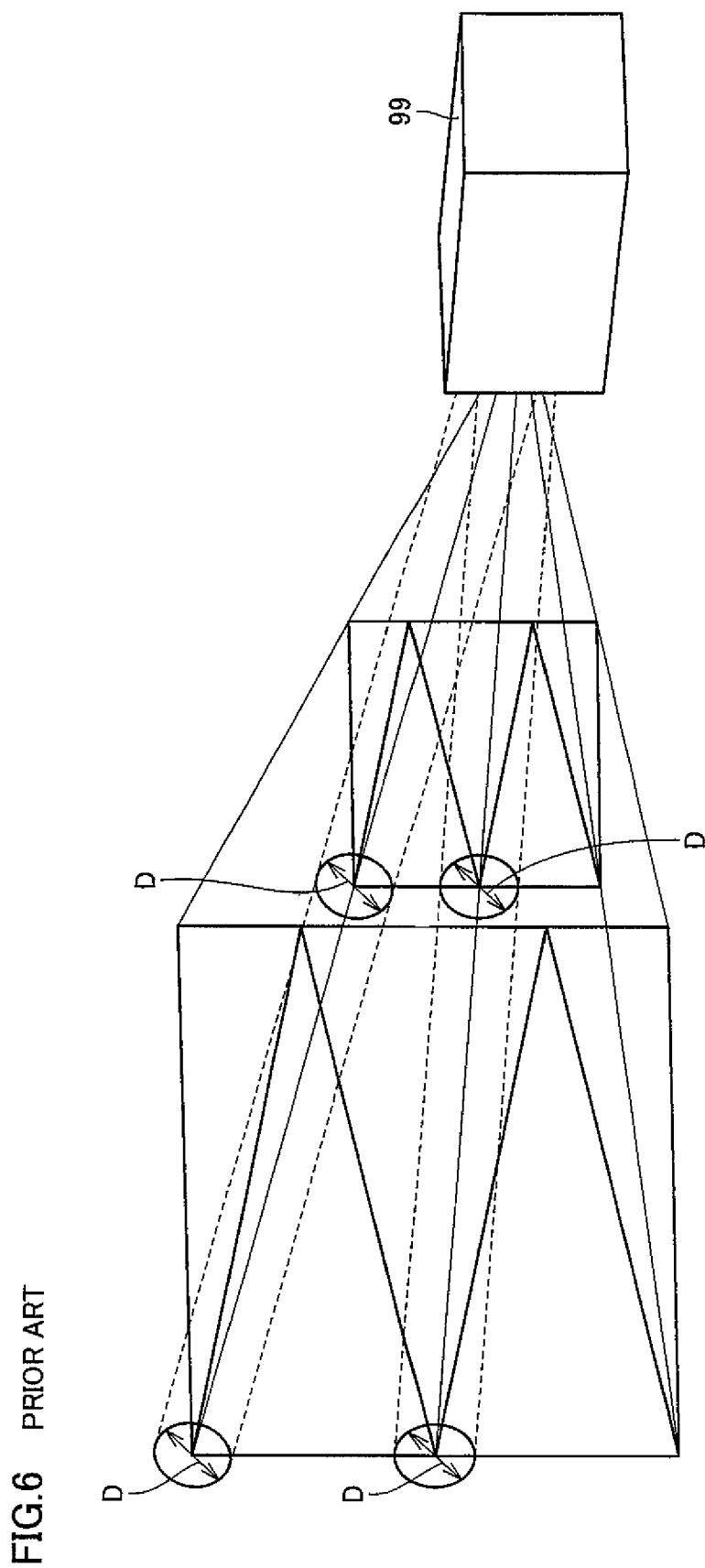
FIG. 6 illustrates projection of light emitted from a laser projector onto a screen in a prior art.

FIG. 5 illustrates a beam projected onto the screen in the embodiment of the invention.

Referring to FIG. 5, scanning mirror 372 reflects the parallel light emitted from enlarging optical unit 371, and projects it onto the screen located at a predetermined distance.

In the case where the laser light emitted from the enlarging optical unit has a beam diameter of D1, the light flux of the projected laser light has a beam diameter of D2 when the screen is spaced from the laser projector by a distance P1, and the light flux of the projected laser light has a beam diameter of D3 when the screen is spaced from the laser projector by a distance P2. There are relationships of (P1<P2) and (D1<D2<D3).

In the embodiment of the invention, as the distance to the screen increases, the display area on the screen enlarges, but the beam diameter of the light flux of the projected laser light also increases. Therefore, such a situation is avoided that a space not irradiated with the laser beam occurs on the screen or the laser beams overlap together on the screen. Therefore, the image displayed on the screen can be clear.

According to the laser projector of the embodiment of the invention, as described above, the enlarging optical unit enlarges the light flux of the laser light so that the beam diameter of the projected laser light increases with the distance to the screen, and the projector can display the clear image.

(Modification)

The invention is not restricted to the above embodiment, and includes, e.g., modifications described below.

(1) Divergent Angle in Each of Horizontal and Vertical Directions

According to the embodiment of the invention, the scanning mirror has swing angle θ in each of the horizontal and vertical directions, and the enlarging optical unit emits the laser light having diverging angle α in all the directions. However, this is not restrictive.

For example, the enlarging optical unit enlarges the light flux of the received light to have a diverging angle αx in the horizontal direction determined by the following equation (A2):

$$\alpha x = \arctan(\tan(\theta x/2)/(XN/2)) \quad (A2)$$

where θx represents the swing angle in the horizontal direction of scanning mirror 372, and XN represents the number of pixels in the horizontal direction of the projected image.

The enlarging optical unit enlarges the light flux of the received light to have a diverging angle αy in the vertical direction determined by the following equation (A3):

$$\alpha y = \arctan(\tan(\theta y/2)/(YN/2)) \quad (A3)$$

where θy represents the swing angle in the vertical direction of scanning mirror 372, and YN represents the number of pixels in the horizontal direction of a projected image.

For causing a difference in diverging angle between the horizontal and vertical directions as described above, the enlarging optical unit may be provided with cylindrical lenses or the like. When αx is different from αy, the laser beam projected onto the screen has an elliptic form.

(2) Arrangement of the Enlarging Optical Unit

Although enlarging optical unit 371 is arranged upstream to scanning mirror 372 in the embodiment of the invention, this is not restrictive. Enlarging optical unit 371 may be arranged downstream from scanning mirror 372, in which case scanning mirror 372 performs raster scan of the laser light emitted from polarization beam splitter 363, and enlarging optical unit 371 enlarges the light flux of the raster-scanned laser light.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A laser projector comprising:
   a laser light source emitting laser light;
   a scanning mirror scanning the laser light emitted from said laser light source; and
   an enlarging optical unit enlarging a light flux of the laser light emitted from said laser light source to have a diverging angle α corresponding to a swing angle of said scanning mirror, wherein said enlarging optical unit enlarges the light flux of said laser light to have the diverging angle α determined by the following equation:

$$\alpha = \arctan(\tan(\theta/2)/(YN/2))$$

where θ represents the swing angle in the horizontal and vertical directions of said scanning mirror, and YN represents a number of pixels in the vertical direction of a projected image.

2. The laser projector according to claim 1, wherein
   said enlarging optical unit enlarges the light flux of said laser light to have a diverging angle αx in a horizontal direction determined by the following equation:

$$\alpha x = \arctan(\tan(\theta x/2)/(XN/2))$$

where θx represents the swing angle in the horizontal direction of said scanning mirror, and XN represents the number of pixels in the horizontal direction of the projected image; and
   said enlarging optical unit enlarges the light flux of said laser light to have a diverging angle αy in the vertical direction determined by the following equation:

$$\alpha y = \arctan(\tan(\theta y/2)/(YN/2))$$

where θy represents the swing angle in the vertical directions of said scanning mirror, and YN represents the number of pixels in the vertical direction of the projected image.

* * * * *